IMPINGEMENT-TYPE SEPARATORS

Original Filed May 24, 1957 2 Sheets-Sheet 1

INVENTORS
WILLIAM M. GAYLORD, JR.
SAMUEL H. S. RAUB
BY John F. Hehmann
ATTORNEY

IMPINGEMENT-TYPE SEPARATORS

Original Filed May 24, 1957 2 Sheets-Sheet 2

INVENTORS
WILLIAM M. GAYLORD, JR.
SAMUEL H. S. RAUB
BY John F. Hohmann
ATTORNEY

United States Patent Office

Re. 25,061
Reissued Oct. 24, 1961

25,061
IMPINGEMENT-TYPE SEPARATORS

Samuel H. S. Raub, Bay Village, Ohio, and William M. Gaylord, Jr., New Canaan, Conn., assignors to Union Carbide Corporation, a corporation of New York Original No. 2,956,641, dated Oct. 18, 1960, Ser. No. 661,450, May 24, 1957. Application for reissue May 1, 1961, Ser. No. 107,288
12 Claims. (Cl. 183—110)

Matter enclosed in heavy brackets [ ] appears in the original patent but forms no part of this reissue specification; matter printed in italics indicates the additions made by reissue.

This invention relates to impingement-type separators and more particularly to impingement-type separators for the removal of finely divided matter from a gas stream.

One disadvantage of the heretofore known impingement-type separators is the difficulty and expense of assembly. This problem is magnified if irregularly shaped impingement members, such as the highly efficient streamlined tear-drop type, are used. This is because there are no flat surfaces to secure tightly even though a rigid support system is essential. If the impingement members are loosely secured, they will rattle and vibrate when exposed to the impingement action of high velocity gas stream. More importantly, if the impingement member is made of relatively low strength material, such as graphite or carbon, the rattling and excessive vibration will cause stress fatigue and eventual breakage. Also, with irregularly shaped members it is generally preferable to retain such members in a certain position relative to the impinging gas stream so as to achieve maximum separation efficiency. This relationship cannot be maintained if the impingement members are not rigidly supported and are allowed to move laterally in their mountings.

Another problem ever present in the prior art impingement-type separators is the difficulty of cleaning such separators; that is, removing the finely divided matter deposited in the separator but not discharged through the drain hole. Such matter must be periodically removed from the separator to avoid excessive reentrainment and loss of separation efficiency. The cleaning problem of impingement separators poses a special problem because the separators are usually placed in staggered rows to achieve maximum separator efficiency, and it is essentially impossible to contact each impingement member with a single cleaning tool such as a brush. In some cases this problem may be solved by use of a cleaning fluid, but in certain applications a suitable cleaning fluid would have a detrimental effect on the impingement members and mechanical cleaning means must be used.

A still further unsolved problem facing the prior art is a method of securing non-metallic impingement members in the separator casing. If the gas stream is acidic, it may be necessary to use a non-metallic chemically inert material such as resin impregnated carbon or graphite to avoid corrosion of the impingement members. In such case, a metal bond is of course unsuitable and a cement joint is to be avoided for ease of disassembly and low cost.

One object of the present invention is to provide a high efficiency impingement-type separator which is relatively easy and economical to assemble.

Another object of the present invention is to provide a high efficiency impingement-type separator which can be easily cleaned without detrimentally affecting the impingement members.

A still further object is to provide a suitable method of securing non-metallic impingement members in the separator casing.

These and other objects and advantages of this invention will be apparent from the following description and accompanying drawings.

The impingement-type separator of the present invention comprises a series of struts positioned normal to the direction of the gas stream flow at substantially uniform intervals across the cross-sectional area of the separator and along the longitudinal flow path of the gas stream so that matter entrained in the gas stream is separated therefrom by impingement against the struts. A series of removable retainers adjacently positioned to each other are provided, such retainers having recesses to hold the opposite ends of the struts in position. The recesses are preferably contoured so that each strut end fits in connecting recesses of adjacent retainers. For example, if a substantially streamlined tear-drop strut is used, the connecting recesses of adjacent retainers are shaped so that the combined contour is a tear-drop shape corresponding to the cross-sectional shape of the struts.

The separator of this invention may be incorporated in either a cylindrical or a rectangular casing, depending on the requirements of the particular application. For example, if the gas flow rate and quantity of finely divided matter entrained therein are relatively low and a cylindrical casing is to be used, the retainers are preferably removable rings extending around the inner circumference of the casing, and adjacently stacked along the casing wall from the inlet to the discharge end. If the cross-sectional area of the casing is relatively large, the retainers are preferably a series of flat strips across the top and bottom of the casing. In the latter case, the struts and strips are assembled in modules which are stacked or adjacently positioned to one another in the separator casing. This type of construction permits the use of relatively short struts in large size separators, which is advantageous because it minimizes re-entrainment of separated matter in the gas stream. Also, short struts are stronger and less likely to break from stress fatigue.

The apparatus of this invention may be easily assembled by first slidably fixing the ends of each strut in the recesses of the retainers, and then inserting a group or stack of the strut-retainer assemblies in the separator casing. One or both of the ends of the casing may then be sealed to hold the stack in position. If the module construction is used, each module may be separately assembled prior to placement in the separator casing. Also, this type of construction facilitates rapid and easy removal of the strut-retainer assemblies from the separator casing for cleaning. This may be accomplished by simply breaking the end seal.

The invention also provides a reliable method of securing non-metallic impingement members in the casing by slidably fixing the strut ends in the contoured recesses of the retainers.

Figure 1:
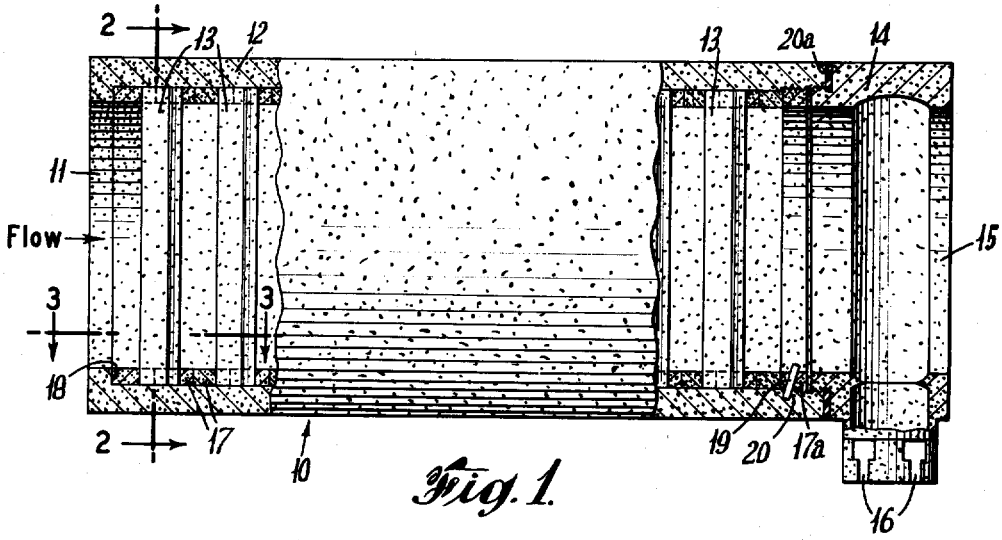
FIG. 1 is a vertical longitudinal section of a cylindrical impingement-type separator embodying one form of the present invention.

Referring more specifically to FIG. 1, a gas stream containing finely divided matter such as particles, droplets of a liquid, or dust suspended in droplets enters the separator 10 at the inlet end 11 of the cylindrical casing 12 and impinges against struts 13, which preferably have a substantially streamlined tear-drop cross-sectional shape. By the combination of impingement and what is believed to be venturi (constricting) action, the finely divided matter is removed from the gas stream and passes into the collector 14 so that the gas emerging through the discharge end 15 is substantially cleaned of the finely divided matter. The deposited matter is discharged from the collector 14 through conduits 16. The struts 13 are preferably retained in staggered rows to insure intimate contact with the circulating gas, and thus achieve high separation efficiency. Also, a substantially streamlined tear-drop cross-section is preferred as the strut configuration since it provides high separation efficiency and minimum re-entrainment with minimum pressure drop because of the relatively smooth contact surfaces. Low pressure drop through the separator is important to minimize the required gas compression and resultant power costs. The struts 13 are preferably positioned in the casing 12 in a direction normal to the gas flow, this relationship also contributing to high separation efficiency. The struts 13 are also spaced at substantially uniform intervals along the longitudinal flow path of the gas for the same reason. The individual struts are held in ring retainers 17, the strut-retainer assemblies being stacked inside the casing 12 and held against the ridges 18 on the inlet end, and by the pin 19 which is tack cemented in an angular hole 20 drilled through the discharge end retainer 17a into the casing 12. The separator 10 and collector 14 are separated by a gasket 20a, and the separator-collector assembly may be mounted between the faces of standard flanges (not shown), with tie rods between such flanges to hold the assembly together and provide gas-tight connections.

The separator-collector assembly is [preferably vertically] positioned [with the inlet end 11 at the top and the discharge end 15 at the bottom.] *as shown in FIG. 1 with the conduits 16 as the lowest part of the assembly.* Also, the tear-drop struts should be positioned with their major [axis] *axes* in the vertical direction. It can be seen that the struts 13 may be easily and quickly removed for cleaning by removing the tie rods, breaking the tack cement joint holding the pin 19 in hole 20, and removing the strut-retainer assemblies from the casing 12. It will also be apparent that this construction facilitates quick and easy reassembly.

Figure 2:
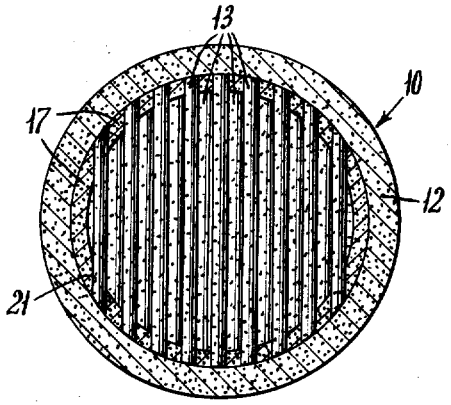
FIG. 2 is a vertical transverse section of the same cylindrical impingement-type separator taken along line 2—2 of FIG. 1.

FIG. 2 illustrates the cross-section of a strut-ring retainer assembly within the separator casing 12. The struts 13 are preferably positioned normal to the gas flow at substantially uniform intervals across the cross-sectional area of the separator casing 12 to obtain uniformly high separation efficiency for all the gas passing through the casing. The struts 13 are slidably mounted in recesses 21 of the ring retainers 17.

Figure 3:
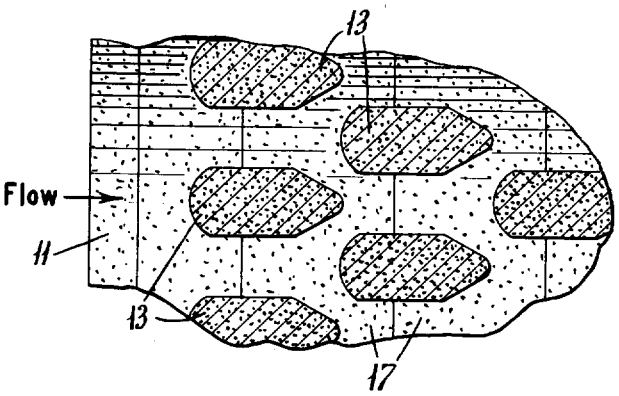
FIG. 3 is a fragmentary horizontal section on an enlarged scale of the strut-retainer recess assembly of the same cylindrical impingement-type separator taken along line 3—3 of FIG. 1.

FIG. 3 shows details of the strut-retainer assembly wherein the ends of the substantially tear-drop shaped struts are slidably mounted in connecting contoured recesses 21 in adjacent retainers 17. It is to be noted that the cross-section of the illustrated struts is not a perfect stream-lined tear-drop shape. This is because of the high cost of machining such perfect shapes and the high separation efficiency of the cheaper, non-perfect tear-drop shapes. Consequently, the phrase "tear-drop shape," as employed herein, includes such non-perfect tear-drop shapes. The struts are positioned with their major diameters substantially parallel to the gas flow. As can be seen, the front part of the strut fits in the retainer nearer the inlet end of the separator, whereas the back part of the strut fits in the adjacent retainer nearer the discharge end. Since in the preferred embodiment the connecting recesses of the adjacent retainers are contoured to form a tear-drop shape, the strut fits tightly in the recesses and impingement by the gas stream does not produce lateral or vertical movement of the strut. The struts are preferably assembled in staggered rows for the aforementioned reasons. Also, the struts are arranged with sufficient clearance between adjacent members so that clogging by deposited matter is avoided. However, the staggered row construction still insures intimate contact between the circulating gas stream and the struts, and together with the preferred tear-drop cross-sectional shape, provides a highly efficient apparatus for removal of the finely divided matter from the gas stream.

This method of holding the struts in the casing is particularly advantageous when the fluids processed require the use of a non-metallic chemically inert material such as resin-impregnated graphite. Since the joint between the struts and the retainer is mechanical, possible corrosion of bonding material is avoided. Also as previously discussed, it would be impossible to use a metal bonding method for a graphite joint, and a cement joint is undesirable for [case] *ease* of disassembly and low cost.

Figure 4:
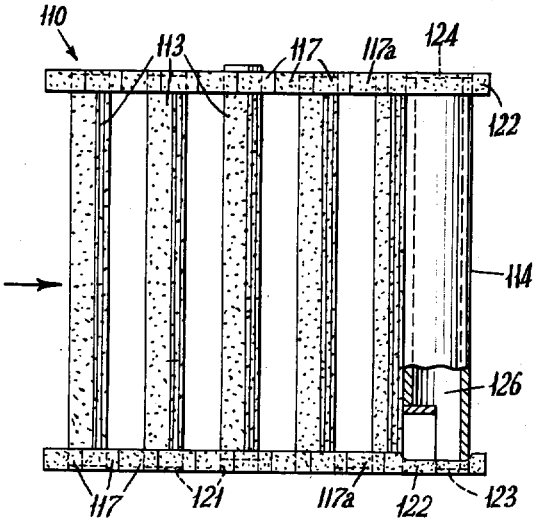
FIG. 4 is a vertical longitudinal and partial cross-sectional view of a module assembly embodying another form of the present invention.
Figure 5:
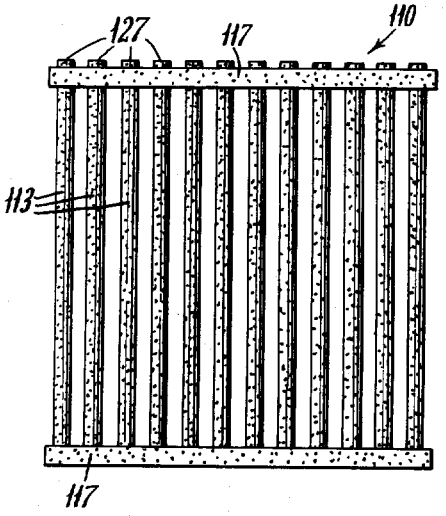
FIG. 5 is an end view of the same module assembly of FIG. 4.
Figure 6:
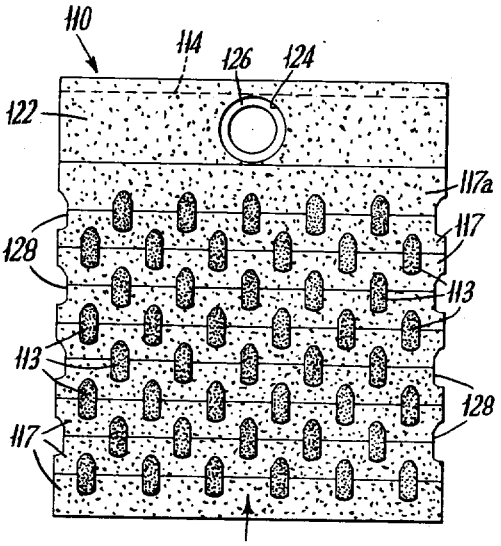
FIG. 6 is a top plan view of the same module assembly of FIG. 4.

FIGS. 4–6 illustrate a module assembly comprising a series of internal struts and separate strut retainer means, which could be adopted for insertion in cylindrical casing 12 (see FIG. 1) or a rectangular casing. It has been found that the separation efficiency of the ring retainer assembly of FIGS. 1–3 decreases when relatively large diameter units, e.g. 24 inches, are used. This is caused by a combination of re-entrainment and inability to drain the deposited matter from the separator at a sufficiently high rate. When relatively large diameter separators and long struts are used, an extremely large quantity of finely divided matter is deposited on the walls of the struts due to the large strut impingement surface, and this matter flows down such walls to the collector and drain connection. Due to the long flow path of such deposited matter, some of it is re-entrained by the circulating gas stream. Also, the matter reaching the collector section tends to build up at the drain connection. Again, part of this buildup may be re-entrained in the circulating gas stream. Additional disadvantages of relatively long struts are high manufacturing costs and the possibility of breakage. A high velocity gas stream establishes lateral vibration if the struts are too long, and this may cause stress fatigue and breakage.

These problems have been solved by using relatively short struts, and retaining the ends of such struts in recesses of strips so as to form module units. Any desired number of modules may be adjacently positioned to each other in the separator casing so as to process any desired quantity of gas without excess re-entrainment of separated matter. This is possible because the module units may be stacked one on top of the other while still retaining relatively short struts, and draining the deposited matter from each module unit through a common drain conduit to a drain opening in the bottom module.

Referring more specifically to FIGS. 4–6, the components which are similar to those shown in other figures are designated by similar reference numerals. The gas stream entering module 110 impinges against the substantially tear-drop shaped struts 113 which are positioned and bounded by a series of strip retainers 117 bonded to each other across the top and bottom of the module unit, and extending from the inlet end to the discharge end of such a unit. The collector 114 communicates with the discharge end of the module unit 110, and includes discharge sheets 122 which are bonded to the top and bottom discharge end retainers 117a. The deposited matter is drained through drain opening 123 in the bottom discharge sheet 122. Also, if another module unit is stacked on top of module 110, the finely divided matter deposited therein is drained into an opening 124 in the top discharge sheet 122. The drained matter passes downwardly through conduit 126 which communicates with bottom opening 123, and is discharged therethrough. It can thus be seen that the module construction provides a method of minimizing re-entrainment of finely divided matter in the circulating gas stream.

The present invention also provides a convenient and efficient method of assembling a group of modules for insertion in the separator casing. First, each module is assembled by inserting the struts 113 in the connecting recesses 121 of adjacent strip retainers 117. Next, the individual modules are assembled together by, for example, placing one module on top of another so that a group of module locking struts 127 which have been assembled so as to telescope above the top strip retainers 117 fit in the corresponding recesses of the bottom strip retainers 117 of the top module. In this manner the modules may be held together and vertically aligned so that the bottom drain opening 123 of the top module is directly centered over the top drain opening 124 of the bottom module. Also adjoining side recesses 128 are provided on the opposite ends of the adjacent strip retainers 117 so that struts 113 may be placed between two modules positioned side-by-side. This is accomplished by contouring the strip ends so that the adjoining recesses of two adjacent strips of a given module form one-half of the tear-drop contour along the major axis of the tear drop.

Figure 7:
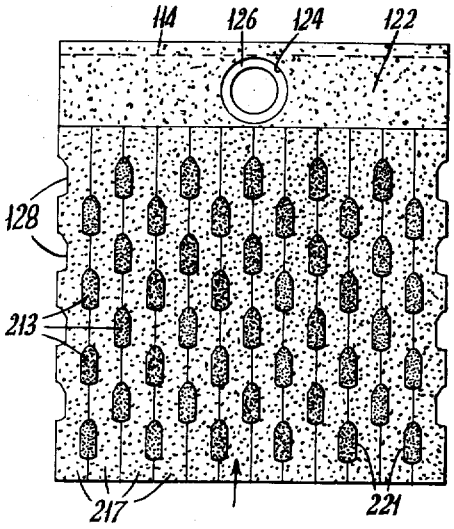
FIG. 7 is a top plan view of an alternate module assembly.

FIG. 7 illustrates an alternate module assembly wherein the strip retainers 217 are assembled parallel instead of normal to the gas flow, as in FIG. 6. Instead of the retainer recesses joining across the width of the tear-drop shape, as in the other figures, the recesses 221 of FIG. 7 join across the length or major diameter of the tear-drop shape, and the struts 213 fit therebetween.

The terms and expressions which have been employed are used as terms of description and not of limitation and there is no intention in the use of such terms and expressions of excluding any equivalents of the features described. It should be recognized that various modifications are possible. For example, instead of the preferred streamlined tear-drop cross-sectional shape, the impingement members could be the V-type of bent sheets or any other conventional shape.

What is claimed is:

1. In an impingement-type separator for the removal of finely divided matter from a gas stream, means for separating such matter comprising a series of struts having a curved cross-sectional shape and being positioned normal to the direction of the gas stream flow at substantially uniform intervals across the cross-sectional area of the separator and along the longitudinal flow path of said gas stream so that matter entrained in the gas stream is separated therefrom by impingement against said struts, and means for holding the struts in such position comprising a series of removable retainers adjacently positioned to each other, said retainers having recesses to hold opposite ends of said struts in position, *and* being arranged and constructed with pairs of recesses in adjacent retainers connecting with each other and contoured to each receive a section of the strut end.

2. An impingement-type separator for the removal of finely divided matter from a gas stream according to claim 1, in which said struts have a tear-drop cross-sectional shape and are positioned with their major diameters substantially parallel to the gas flow direction.

3. An impingement-type separator for the removal of finely divided matter from a gas stream according to claim 1, in which the combined contour of such connecting recess pairs corresponds to the cross-sectional shape of the struts.

4. An impingement-type separator for the removal of finely divided matter from a gas stream according to claim 1, in which said struts have a tear-drop cross-sectional shape, and the combined contour of such connecting recess pairs is a tear-drop shape corresponding to the cross-sectional shape of the struts.

5. An impingement-type separator for the removal of finely divided matter from a gas stream according to claim 1, in which said struts have a tear-drop cross-sectional shape and are positioned with their major diameters substantially parallel to the gas flow; and the combined contour of such connecting recess pairs is a tear-drop shape corresponding to the cross-sectional shape of the struts.

6. An impingement-type separator for the removal of finely divided matter from a gas stream comprising a cylindrical casing having a gas inlet end and a gas discharge end; a series of internal struts having a curved cross-sectional shape and being positioned normal to the flow direction of said gas stream at substantially uniform intervals across the cross-sectional area of the casing and along the longitudinal flow path of said gas stream so that matter entrained in the gas stream is separated therefrom by impingement against such struts; and a series of removable rings adjacently positioned to each other and extending from the inlet end to the discharge end of said casing, said rings having recesses to hold opposite ends of the struts in position, and being arranged and constructed with pairs of recesses in adjacent retainers connecting with each other and contoured to each receive a section of the strut end.

7. An impingement-type separator for the removal of finely divided matter from a gas stream according to claim 6, in which said struts have a tear-drop cross-sectional shape and are positioned with their major diameters substantially parallel to the gas flow direction.

8. An impingement-type separator for the removal of finely divided matter from a gas stream comprising a casing having a gas inlet end and a gas discharge end; a series of internal struts having a curved cross-sectional shape and being positioned normal to the flow direction of said gas stream at substantially uniform intervals across the cross-sectional area of the casing and along the longitudinal flow path of said gas stream so that matter entrained in the gas stream is separated therefrom by impingement against such struts; and strut retainer means comprising a series of adjacent strips positioned across the top and bottom of the casing and extending from the inlet to the discharge end of said casing, such retainer means having recesses to hold opposite ends of the struts in position, *and* being arranged and constructed with pairs of such recesses in adjacent strips connecting with each other and contoured to each receive a section of the strut end.

9. An impingement-type separator for the removal of finely divided matter from a gas stream according to claim 8, in which said struts have a tear-drop cross-sectional shape, and the combined contour of such connecting recess pairs is a tear-drop shape corresponding to the cross-sectional shape of the struts.

10. An impingement-type separator for the removal of finely divided matter from a gas stream comprising a cylindrical casing having gas inlet and gas discharge ends; a series of internal struts having a tear-drop cross-sectional shape positioned normal to the flow direction of said gas stream at substantially uniform intervals across the cross-sectional area of the casing and along the longitudinal flow path of said gas stream so that matter entrained in the gas stream is separated therefrom by impingement against such struts; and a series of removable rings adjacently positioned to each other and extending from the inlet end to the discharge end of said casing, said rings having recesses to hold opposite ends of the struts in position, and being arranged and constructed with pairs of such recesses in adjacent rings connecting with each other and jointly forming a tear-drop shaped contour corresponding to the cross-sectional shape of the struts.

11. An impingement-type separator for the removal of finely divided matter from a gas stream comprising a casing having a gas inlet end and a gas discharge end; a module assembly insertable into and removable from said casing, said module comprising a series of internal struts and separate strut retainer means, said struts having a curved cross-sectional shape and being positioned normal to the flow direction of said gas stream at substantially uniform intervals across the cross-sectional area of the module and along the longitudinal flow path of said gas stream so that matter entrained in the gas streams is separated therefrom by impingement against such struts, said strut retainer means being positioned at each end of the struts and having recesses to hold opposite ends of the struts in position, and being arranged and constructed with pairs of recesses in adjacent retainers connecting with each other and contoured to each receive a section of the strut end.

*12. An impingement-type separator for the removal of finely divided matter from a gas stream, which separator comprises a casing having a gas inlet end and a gas discharge end; an assembly of modules insertable into and removable from said casing, said modules each comprising a series of internal struts and separate strut retainer means, said struts having a curved cross-sectional shape and being positioned normal to the flow direction of said gas stream at substantially uniform intervals across the*

*cross-sectional area of each module and along the longitudinal flow path of said gas stream so that matter entrained in the gas streams is separated therefrom by impingement against such struts, said strut retainer means being positioned at each end of the struts and having recesses to hold opposite ends of the struts in position, and said modules being arranged and constructed with pairs of recesses in adjacent strut retainer means connecting with each other and contoured to each receive a section of the strut end, thereby holding struts in position between preselected adjacent modules.*

References Cited in the file of this patent or the original patent

UNITED STATES PATENTS

| | | |
|---|---|---|
| 718,805 | Watts | Jan. 20, 1903 |
| 1,016,741 | Fritz | Feb. 6, 1912 |
| 1,336,870 | Tracy | Apr. 13, 1920 |
| 1,521,348 | Ambruster | Dec. 30, 1924 |
| 1,807,983 | Hegan et al. | June 2, 1931 |
| 1,876,406 | Feuillee | Sept. 6, 1932 |
| 1,886,927 | Williams | Nov. 8, 1932 |
| 2,078,558 | Brell | Apr. 27, 1937 |
| 2,785,768 | Gauchard | Mar. 19, 1957 |